(12) United States Patent
Mulligan et al.

(10) Patent No.: US 7,898,825 B2
(45) Date of Patent: Mar. 1, 2011

(54) ADAPTIVE RAMP COMPENSATION FOR CURRENT MODE-DC-DC CONVERTERS

(75) Inventors: Michael D Mulligan, Davis, CA (US); Philip John Crawley, Folsom, CA (US); John Camagna, El Dorado Hills, CA (US)

(73) Assignee: Akros Silicon, Inc., Folsom, CA (US)

( * ) Notice: Subject to any disclaimer, the term of this patent is extended or adjusted under 35 U.S.C. 154(b) by 195 days.

(21) Appl. No.: 12/054,301

(22) Filed: Mar. 24, 2008

(65) Prior Publication Data

US 2009/0237058 A1    Sep. 24, 2009

(51) Int. Cl.
*H02M 3/335* (2006.01)
(52) U.S. Cl. ...................... 363/21.13; 363/97
(58) Field of Classification Search .................. 323/288; 363/21.04, 21.05, 21.12, 21.13, 97
See application file for complete search history.

(56) References Cited

U.S. PATENT DOCUMENTS

| | | | | |
|---|---|---|---|---|
| 4,837,495 A | * | 6/1989 | Zansky | 323/222 |
| 4,975,820 A | * | 12/1990 | Szepesi | 363/21.17 |
| 5,903,452 A | | 5/1999 | Yang | |
| 6,229,293 B1 | * | 5/2001 | Farrenkopf | 323/288 |
| 6,522,116 B1 | * | 2/2003 | Jordan | 323/288 |
| 7,176,668 B2 | * | 2/2007 | Oswald et al. | 323/285 |
| 7,262,530 B2 | * | 8/2007 | Becker et al. | 310/89 |
| 7,265,530 B1 | | 9/2007 | Broach et al. | |
| 2006/0091872 A1 | * | 5/2006 | Matsuura | 323/283 |
| 2006/0284607 A1 | * | 12/2006 | Isobe | 323/282 |

* cited by examiner

*Primary Examiner*—Adolf Berhane
*Assistant Examiner*—Jeffrey Gblende
(74) *Attorney, Agent, or Firm*—Koestner Patent Law; Ken J. Koestner

(57) ABSTRACT

A current-mode controller comprises an inductance element, at least one semiconductor switch coupled to the inductance element, and a ramp compensator coupled to sense an indication of current through the inductance element and coupled to control the at least one semiconductor switch that senses current during on-time of the DC-DC converter, infers current during off-time of the DC-DC converter, and determines a slope compensation signal based on the sensed and inferred currents.

7 Claims, 14 Drawing Sheets

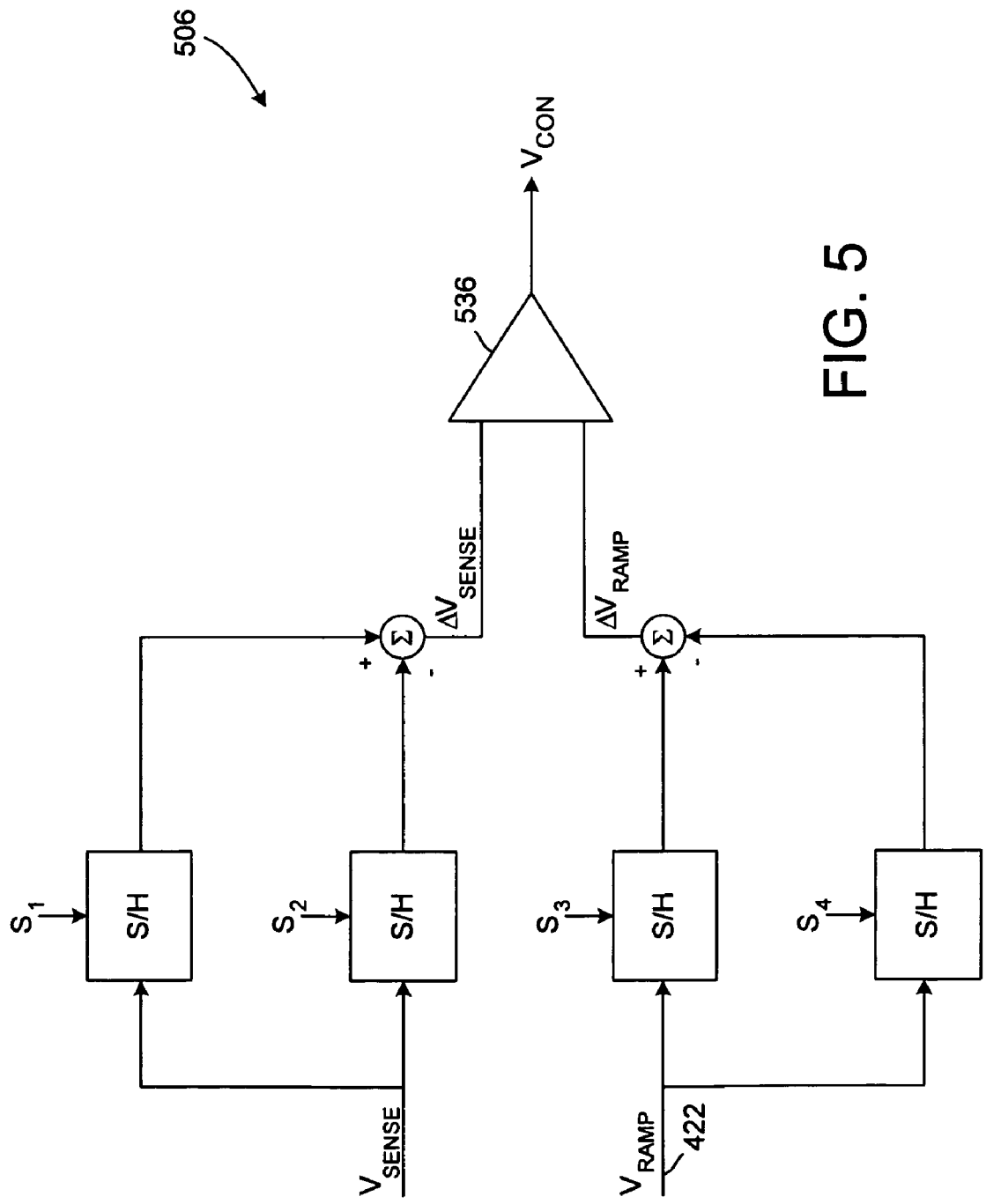

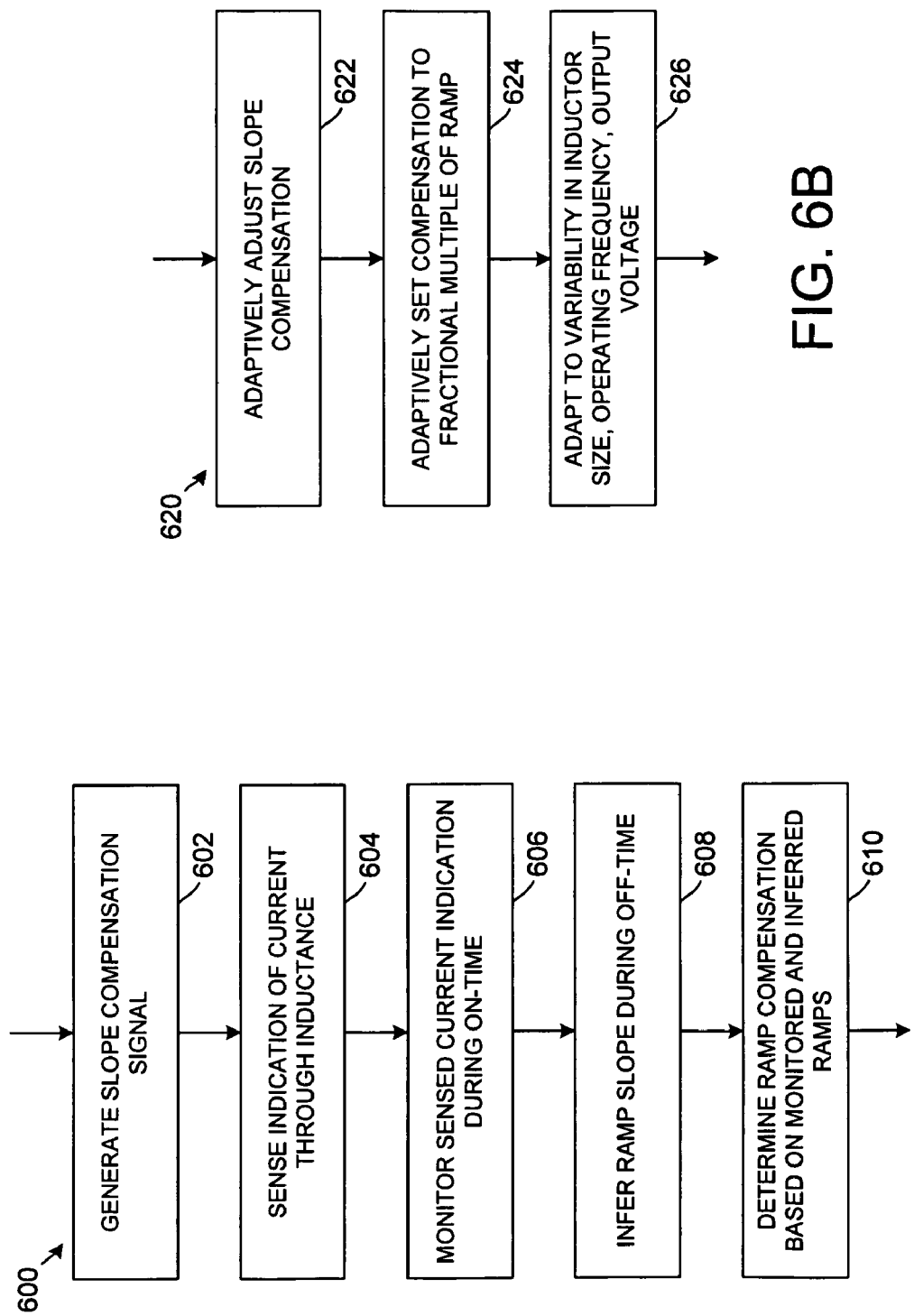

ADAPTIVE RAMP COMPENSATION FOR CURRENT MODE-DC-DC CONVERTERS

BACKGROUND

DC to DC converters are useful in portable electronic devices such as mobile telephones, palm and laptop computers, and various other devices, which have power supplied from batteries. Portable electronic devices often are constructed from multiple circuits, each of which may operate at a voltage level that is different or even a voltage at a different polarity from other circuits. DC to DC converters can generate multiple controlled voltages from a single variable battery voltage and can accommodate a decrease in battery voltage as stored power drains, enabling improved power control and saving space through usage of a single battery instead of using multiple batteries to supply different voltages to different circuits in the device.

SUMMARY

According to an embodiment of an electronic device, a current-mode controller comprises an inductance element, one or more semiconductor switches coupled to the inductance element, and a ramp compensator coupled to sense an indication of current through the inductance element and coupled to control the semiconductor switch or switches. The ramp compensator senses current during on-time of the DC-DC converter, infers current during off-time of the DC-DC converter, and determines a slope compensation signal based on the sensed and inferred currents.

BRIEF DESCRIPTION OF THE DRAWINGS

Embodiments of the invention relating to both structure and method of operation may best be understood by referring to the following description and accompanying drawings:

FIG. 5 is a schematic block diagram showing another embodiment of a ramp compensation adjustment circuit that can be used in a current-mode controller;

FIGS. 6A through 6C are flow charts showing one or more embodiments or aspects of a current-mode control method;

DETAILED DESCRIPTION

An adaptive ramp compensation technique for DC-DC converters enables straight-forward and efficient ramp compensation that can be implemented without additional circuitry, such as measurement circuitry, beyond structures already in a current loop. Specifically, the technique can be performed with no additional measurements, no voltage sensing across the inductor, no additional current sensing, and the like. The adaptive ramp compensation can be implemented by measuring voltages that are inherently available, so that additional sensing circuitry can be avoided. The technique can be implemented in one minor computation and one minor comparison.

Figure 1A:
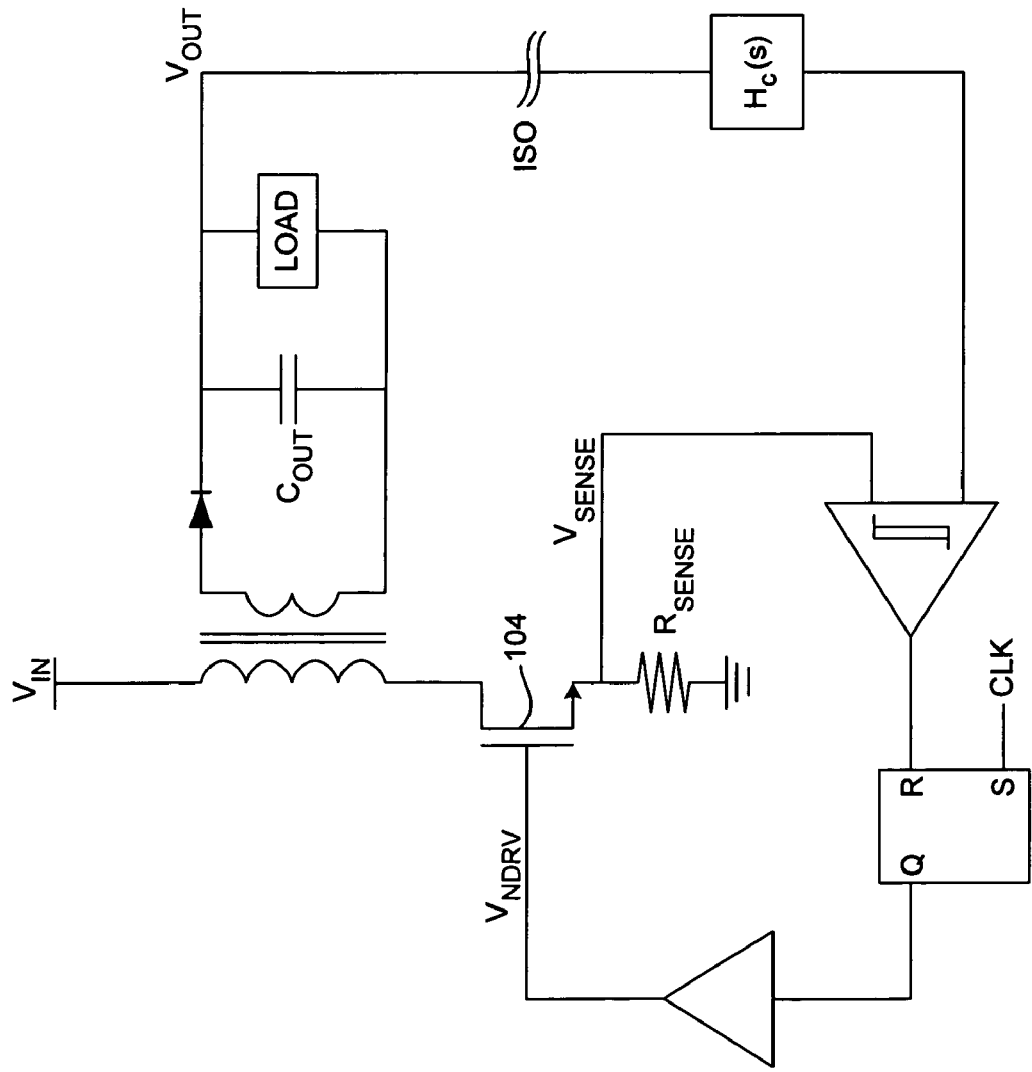
FIGS. 1A and 1B are schematic block and circuit diagrams illustrating embodiments of a current-mode controller.

Referring to FIG. 1A, a block and circuit diagram shows an example of a current-mode control method using adaptive ramp compensation for current-mode DC-DC converters. A current-mode converter in a fly-back configuration is depicted in FIG. 1A. Other embodiments and implementations can have current-mode control configured in other topologies, for example Buck converter, Boost converter, or any other suitable topology can have a current-mode control.

Current-mode control manages peak current, thereby changing the converter into a current source and changing converter time-frequency operation from second-order into first-order.

The depicted current-mode controller can be used in a switching converter and includes a feedback loop which sets the duty cycle of switching. In a voltage-controlled converter, duty cycle is set directly by the control voltage. Control of the duty cycle propagates to the output terminal $V_{OUT}$. Current is sensed using the sense resistor $R_{SENSE}$ and a switch 104 is controlled using drive signal $V_{NDRV}$ to command the supply of a selected current to an output capacitor $C_{OUT}$. The illustrative control technique enables a voltage source power supply configuration to operate in the manner of a current source power supply, thereby simplifying dynamics and increasing feedback loop speed. Typically, a control technique involves sensing the current at the switch 104 and comparing the sensed current to a reference value. The feedback loop can be broken to enable manual control, for example using a control knob, to determine the current value. A regulator can be implemented to supply feedback and compensation.

One difficulty with the current-mode control technique depicted in FIG. 1A is that the system can be unstable if the duty cycle (D) is greater than 50%. The current-mode loop is inherently unstable just by the nature of operation for duty cycle greater than 50% which creates oscillations and subharmonics resulting in instability or other types of bad behavior. Generally, a sawtooth can be added to the sensed current that, depending on the slope of the ramp, can cancel bad effects and stabilize the loop.

Figure 1B:
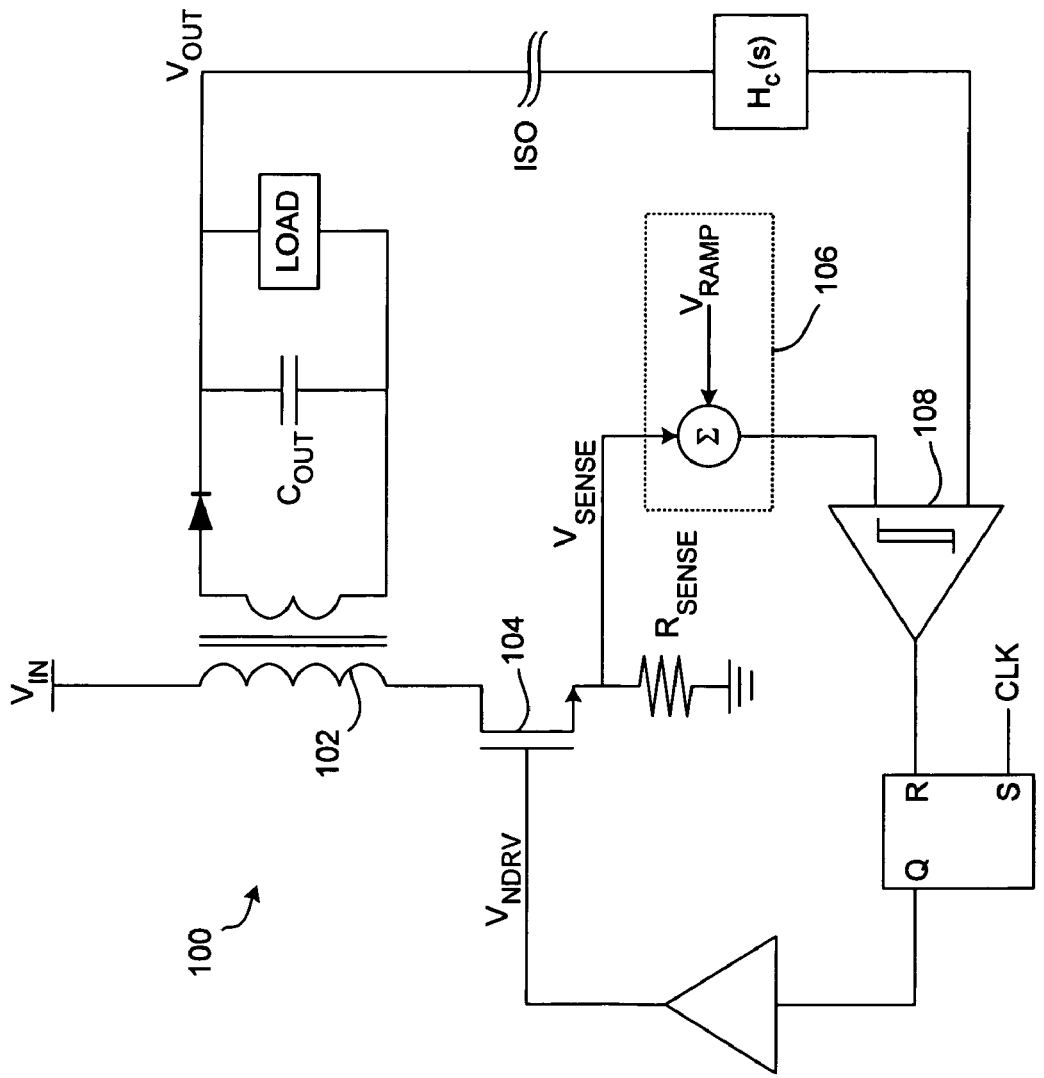

Unstable behavior can be mitigated by adding a compensating ramp as shown in FIG. 1B, a schematic block and circuit diagram illustrating an embodiment of a current-mode controller 100. The current-mode controller 100 comprises an inductance element 102, one or more semiconductor switches 104 coupled to the inductance element, and a ramp compensator 106. The ramp compensator 106 is coupled to sense an indication of current through the inductance element 102 and coupled to control the semiconductor switch or switches 104.

The ramp compensator 106 measures an on-ramp slope of a sensed current indication, infers an off-ramp slope, and adaptively adjusts a slope compensation signal slope to track changes in the off-ramp slope.

In a particular implementation, the ramp compensator 106 can be coupled to sense an indication of current through the inductance element 102 and through the one or more semiconductor switches 104. The ramp compensator 106 generates a slope compensation signal based on a measurement of a ramp slope of the sensed current indication when the semiconductor switch or switches 104 conduct current through the inductance element 102 and an inference of a ramp slope when the semiconductor switch or switches 104 stops passage of current through the inductance element 102.

For example, in some embodiments the ramp compensator 106 can be configured to adaptively set a slope compensation signal slope to a fractional multiple of the off-ramp slope.

In some implementations, the ramp compensator 106 can be configured to adaptively set a slope compensation signal slope to a fractional multiple of the off-ramp slope that adapts to variability in selection of inductor size, operating frequency, and/or output voltage.

Figure 2A:
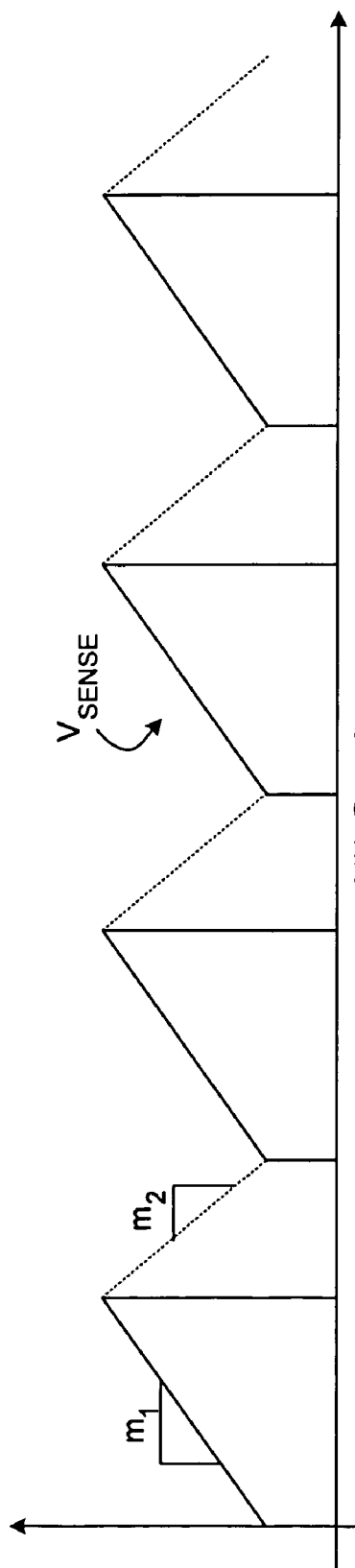
FIGS. 2A, 2B, and 2C are a group of graphs respectively showing waveforms for usage in ramp compensation.
Figure 2B:
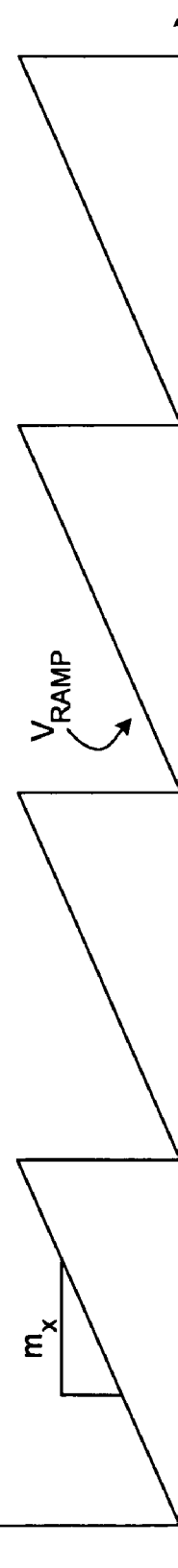
Figure 2C:
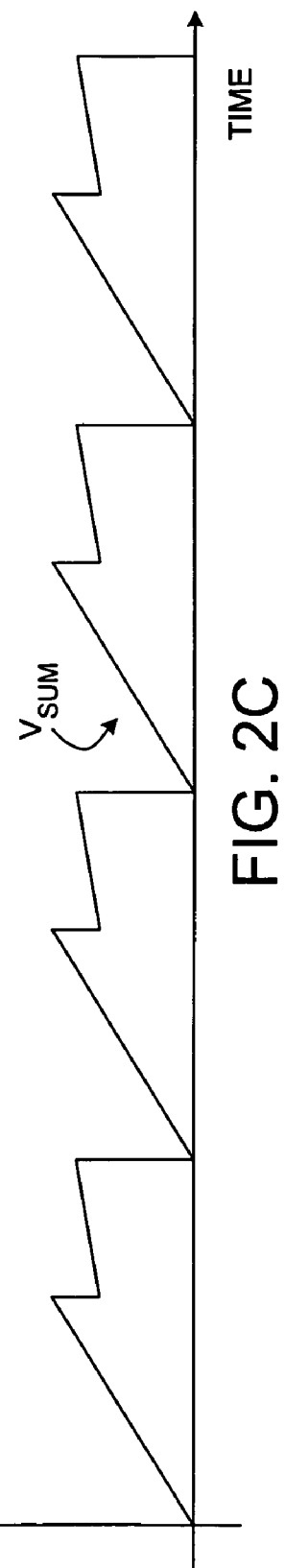

Referring to FIGS. 2A, 2B, and 2C, a group of graphs respectively depict waveforms for usage in ramp compensation including a sense voltage $V_{SENSE}$, a ramp voltage $V_{RAMP}$, and a sum voltage $V_{SUM}$ which corresponds to the sum of $V_{SENSE}$ plus $V_{RAMP}$ and applied to comparator 108 to be compared to a control voltage in the feedback loop.

The sense voltage $V_{SENSE}$ and has a slope value $m_1$ which can be measured during the active or on-time of sensing and is depicted as a solid-line in the $V_{SENSE}$ waveform. During the voltage sensing on-time, the switch 104 is "on" an enables current flow through the inductive element 102. An off-time also takes place when sensing is interrupted because the switch 104 is "off" by the nature of circuit operation. In an illustrative embodiment, the switch 104 can be an N-channel metal oxide semiconductor (NMOS) device. When the NMOS device 104 shuts off, current flow is interrupted so that feedback is also interrupted, a condition that is generally true in nearly all switching converters with some possible exceptions. For current-mode control, the switch 104 activates sensing of current through the resistor $R_{SENSE}$ for a controlled on-time period for detection and measurement of the sense voltage $V_{SENSE}$, for example by sensing the drain-source voltage of the NMOS device 104 or other suitable sensing technique. In various implementations, some technique is employed for sensing current and feeding back the measurement. Regardless of the method for sensing current, the current is compensated.

During the on-time of sensing, current through the inductor element or a parameter directed related to the current, for example the upward slope of $V_{SENSE}$, can be measured, while the off-time such as the downward slope of $V_{SENSE}$ cannot be directly measured. In the illustrative current-mode controller, the implemented adaptive ramp compensation technique uses an implication of an off-time measurement as a control signal. The nature of a steady state system or a steady-state periodic signal is that if the waveform increases by a particular amount during the on-time part of the cycle, then by the time the cycle repeats the waveform has to go back down to the same starting value since the steady-state value can be presumed to be periodic.

FIG. 2A shows the sense voltage $V_{SENSE}$ with a rising on-time slope $m_1$ and a falling off-time slope $m_2$. FIG. 2B illustrates the ramp voltage $V_{RAMP}$ with a slope of compensation $m_X$. A rule-of-thumb technique for setting the slope of the compensating ramp $m_X$ to ensure stability can be that a minimum value of $m_X$ that ensures loop stability for all duty cycles is given by the equation (1) as follows:

$$m_X = \frac{1}{2}m_2. \qquad (1)$$

Compliance with equation (1) ensures feedback loop stability in the current loop. If the compensation slope $m_X$ is too large, the converter reverts to a second-order voltage-mode loop, potentially resulting in converter instability. The physical meaning of equation (1) can be expressed by considering that the feedback loop is broken and the ramp voltage $V_{RAMP}$ is applied as a control input signal, then if the compensation slope $m_X$ is set equal to half the off-time slope $m_2$, then the inherently unstable current-mode loop becomes stable regardless of the duty cycle. Stability is ensured since setting the amount of current supplied to the output signal adjusts the duty cycle of the waveform indirectly. Regardless of the relationship of input voltage $V_{IN}$ to output voltage $V_{OUT}$, as long as the relationship between compensating ramp slope $m_X$ and the off-time slope $m_2$ is maintained, then the loop is stable.

The stable condition relates to current-mode loop stability. If conditions are created, for example by adding feedback and other compensation that adversely affect the voltage loop, then instability can result that is independent of current-mode loop stability.

In other embodiments or conditions, other values of ramp compensation can be selected. For example, compensation $m_X$ can be set equal to $m_2$. If $m_X$ is set too low, instability can result. If $m_X$ is set too high, the system operates more in the manner of a voltage-mode converter since the $V_{RAMP}$ upslope becomes dominant and the current-based portion of the sum $V_{SUM}$, shown in FIG. 2C, becomes negligible whereby the system essentially operates as a voltage-mode loop and fails to attain the advantages of current-mode converter operation.

A ramp compensation technique as disclosed by the systems and methods disclosed herein involves setting compensation $m_X$ to be some fraction or fractional multiple of the off-time slope $m_2$. The specific ratio of $m_X$ to $m_2$ may be one-half, one, or any suitable value. Any suitable multiple can be implemented in various embodiments or conditions. What is desired, regardless of external conditions, is to ensure a predetermine relationship of $m_X$ to $m_2$.

A problem with setting $m_X$ to be a specific multiple of $m_2$ is that the off-time slope $m_2$ can vary as a function of various parameters or conditions such as the inductance of an off-chip component such as an inductor and can vary as a function of output voltage, and possibly other conditions that are not necessarily constant. For example, a particular integrated circuit can be implemented in combination with components such as inductors with different sizes or in a system that operates at various frequencies or with various output voltage settings, all variables that determine off-time slope $m_2$. Therefore, if $m_X$ is selected in a manner that turns out to be incorrect, the system is limited in what can be selected for external values.

Accordingly, an adaptive ramp compensation technique and associated circuits and systems are disclosed herein that enable usage of the system or, for example, integrated circuit with an expanded range of components or operable in an expanded range of conditions. In an adaptive ramp compensation system, the implementation or conditions are not bound by compensation slope considerations. The systems, circuits, and techniques disclosed herein enable a selected relationship between $m_X$ to $m_2$ at any suitable multiple ratio that is appropriate regardless of the inductor included in the system, the selected output voltage, or other conditions or considerations. The systems, circuits, and techniques disclosed herein further enable a system or integrated circuit to adapt to the selected conditions and implementations. The systems, circuits, and techniques disclosed herein further enable setting of duty cycle in an indirect way.

The structures and methods disclosed herein enable adaptive ramp compensation in a configuration, for example a flyback converter, Buck converter, or other circuit, that enables direct determination of the upward or on-time slope but does not permit direct measurement of the downward or off-time slope. Generally, the upward, on-time slope can be measured as a voltage that is actually sensed, but the downward, off-time slope cannot be measured since the switch is off at the time. Attempting to measure the current during the downward slope or off-time gives a result of zero.

Accordingly, the illustrative adaptive ramp compensation technique and associated circuit enable $m_2$ to be inferred from the on-time measurement. The inference is made because, for steady-state operation, the change during the on-time is presumed to be opposite in slope but equal in magnitude to the change in the off-ramp.

Since $m_2$ depends fundamentally on output voltage $V_{OUT}$ and inductance L, ramp compensation is application dependent. Therefore the illustrative structures and techniques adaptively adjust $m_X$ to track changes in $m_2$.

Adaptive slope adjustment enables setting of ramp compensation according to equation (2) as follows:

$$m_X = k \cdot m_2, \qquad (2)$$

which exploits direct measurement of the on-time inductor current slope. Through sense voltage $V_{SENSE}$, but not off-time slope. However, $m_2$ can be inferred from the on-time current sense. In some implementations, $m_X$ and $m_2$ may be desired to be equal (k=1) or have a defined relationship as defined by the gain factor k.

One advantage of the illustrative adaptive ramp compensation technique is that, in a non-isolated converter such as a Buck converter, the $m_2$ value is equal to the output voltage $V_{OUT}$ divided by the inductance L. In the case of an isolated converter in other topologies, the $m_2$ value depends on other factors. For example, for an isolated converter the number of turns or the turn-ratio in the transformer can affect $m_2$. Regardless of any other conditions affecting $m_2$, the relationship between $m_X$ and $m_2$ is maintained even though, in an isolated converter, the negative slope $m_2$ does not actually exist. Instead a slope with a form that approximates $m_2$ exists with a magnitude that varies, for example as a function of turns ratio of the inductor.

The inference of $m_2$ effectively results in accurate adaptive control in the control loop since, in a steady-state system, the increasing sense voltage $V_{SENSE}$ has to be decreased by a predictable amount that corresponds to $m_2$.

The illustrative adaptive ramp compensation technique adapts the slope $m_X$ of the ramp to an inferred slope $m_2$ of the sense signal during on-time to enable loop stability. Stability is not other otherwise measured but rather the compensating ramp is a fraction of the slope, a condition for which stability is presumed.

In an illustrative embodiment, stability is not guaranteed but rather the ramp slope is set to a target slope, ensuring current-loop stability but without necessarily dealing with other sources of instability. The adaptive ramp compensation technique increases the range of inductance values and output voltage values.

Figures 3A, 3B:
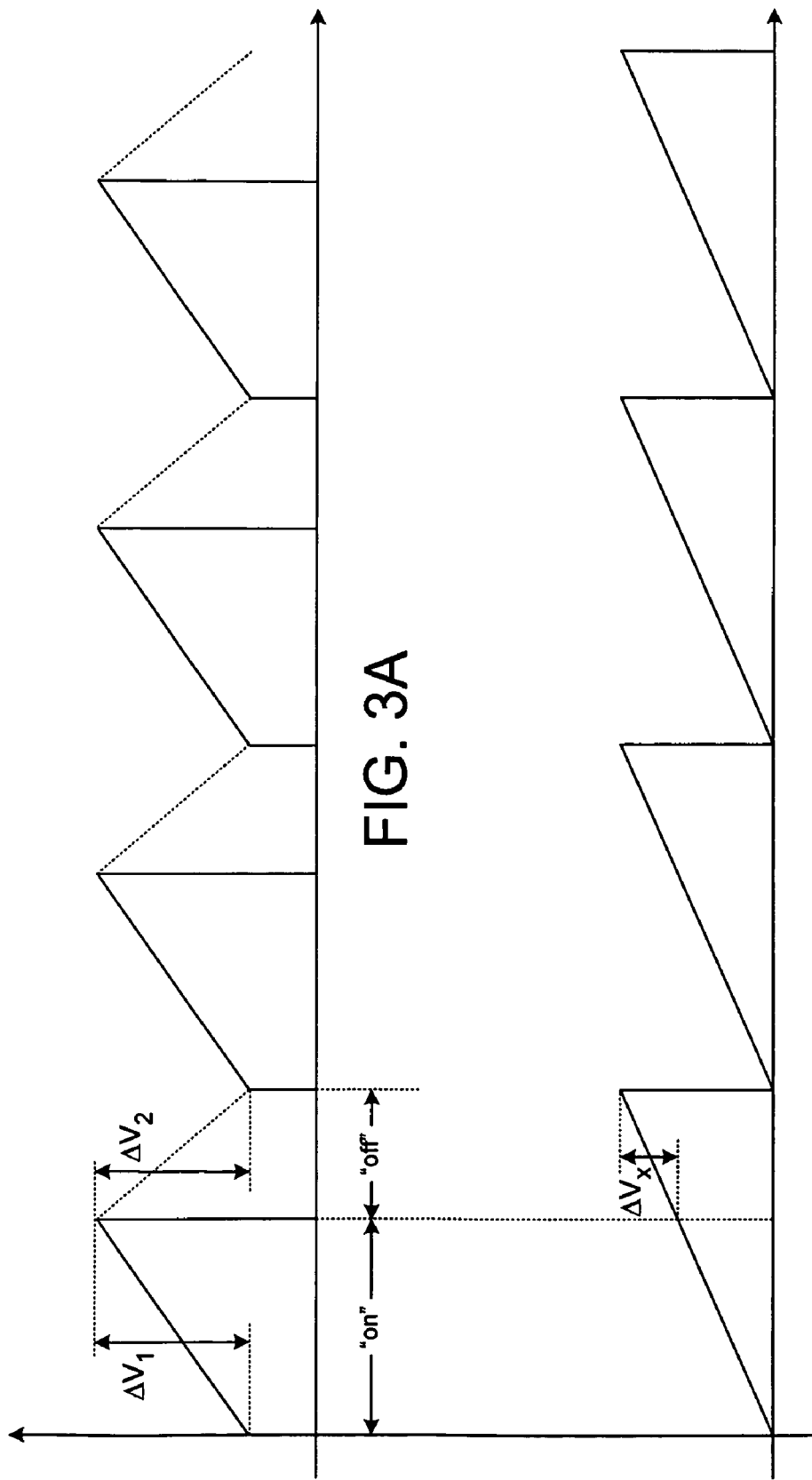
FIGS. 3A and 3B are graphs respectively depicting examples of sense voltage $V_{SENSE}$ and ramp voltage $V_{RAMP}$ for determination of control by the ramp compensator in an embodiment of a current-mode controller.

FIGS. 3A and 3B are graphs respectively showing examples of sense voltage $V_{SENSE}$ and ramp voltage $V_{RAMP}$ for adaptive ramp compensation. To set $m_X$, the on-time delta $\Delta V_1$ is measured during on-time from the sense voltage $V_{SENSE}$ shown in FIG. 3A and the delta $\Delta V_X$ is measured during off-time from the ramp voltage $V_{RAMP}$ shown in FIG. 3B. The ramp slope is increased or decreased depending on whether the $\Delta V_X$ is smaller or larger, respectively, than $\Delta V_1$. Compensation can be implemented with a gain factor k if desired.

Adaptive ramp compensation is performed by measuring $\Delta V_1$ during a selected sample period during the switch on-time, which enables the inference of $\Delta V_2$ during the off-time period. In an example implementation, delta $\Delta V_1$ of the on-time ramp can be presumed to be equal to the negative delta $\Delta V_2$ of the off-time ramp so that $\Delta V_1$ is measured over the on-time and $\Delta V_X$ is measured over the off-time. The value of $\Delta V_2$ for the off-time can be estimated on the basis of a comparison of $\Delta V_X$ compare to $\Delta V_1$. Accordingly, the change in voltage $\Delta V_1$ is measured during the on-time and the ramp slope is adjusted to attempt to push $\Delta V_X$ to equal $\Delta V_1$.

Referring to FIGS. 3A and 3B, graphs respectively show examples of sense voltage $V_{SENSE}$ and ramp voltage $V_{RAMP}$ for determination of control by the ramp compensator 106 in an embodiment of a current-mode controller 100. The ramp compensator 106 can be configured to measure the indication of current as a sense voltage $V_{SENSE}$ and determine a switch on-time sense voltage $V_{SENSE}$ delta $\Delta V_1$ when the semiconductor switch or switches 104 enable current through the inductance element and to measure a ramp voltage $V_{RAMP}$ and determine a switch off-time ramp voltage $V_{RAMP}$ delta $\Delta V_X$ when the semiconductor switch or switches 104 disable current through the inductance element. The ramp compensator 106 compares $\Delta V_X$ to $\Delta V_1$, and adaptively increases or decreases the ramp voltage $V_{RAMP}$ delta $\Delta V_X$ based on the comparison. FIG. 3A shows the sense voltage $V_{SENSE}$ which corresponds to the current sense. FIG. 3B shows the compensation ramp $V_{RAMP}$ in time relation to the $V_{SENSE}$ signal.

Figure 4:
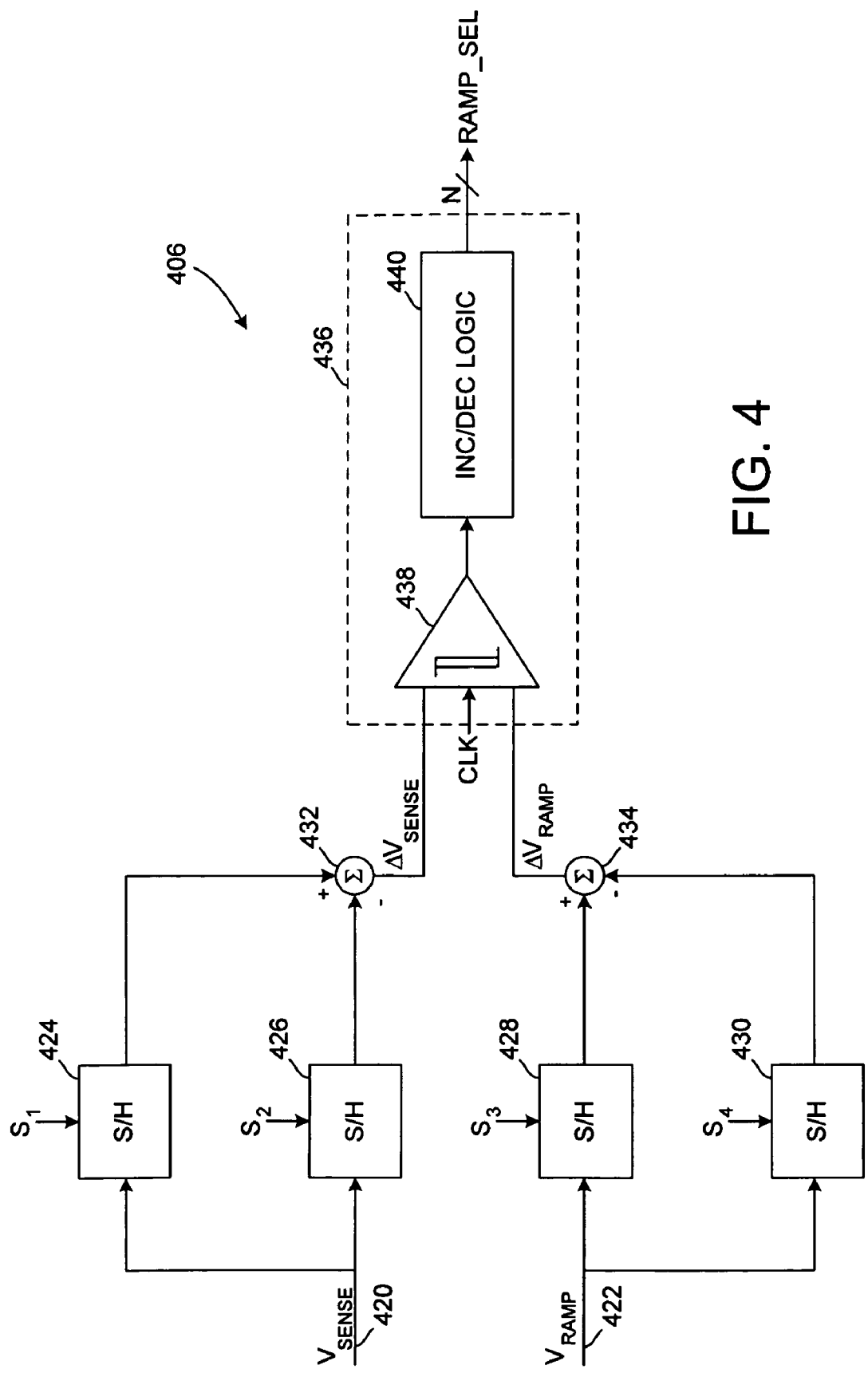
FIG. 4 is a schematic block diagram showing an embodiment of a ramp compensation adjustment circuit that can be used in a current-mode controller.

Referring to FIG. 4, a schematic block diagram shows a generic block level circuit that can be used to perform the described adaptive ramp compensation method and shows an embodiment of a ramp compensation adjustment circuit 406 that can be used in a current-mode controller. The illustrative ramp compensation adjustment circuit 406 is coupled to a sense voltage $V_{SENSE}$ input line 420 and a ramp voltage $V_{RAMP}$ input line 422 comprises multiple sample-and-hold devices. In an example embodiment, the ramp compensation adjustment circuit 406 comprises a first sample-and-hold 424 coupled to the sense voltage $V_{SENSE}$ input line 420 that is actuated by a sampling signal $S_1$ at on-time beginning of the semiconductor switch or switches, a second sample-and-hold 426 coupled to the sense voltage $V_{SENSE}$ input line 420 that is actuated by a sampling signal $S_2$ at on-time termination of the semiconductor switch or switches, a third sample-and-hold 428 coupled to the ramp voltage $V_{RAMP}$ input line 422 and actuated by a sampling signal $S_3$ at off-time beginning of the semiconductor switch or switches, and a fourth sample-and-hold 430 coupled to the ramp voltage $V_{RAMP}$ input line 422 that is actuated by a sampling signal $S_4$ at off-time termination of the semiconductor switch or switches. A first difference element 432 is coupled to the first 424 and second 426 sample-and-holds and determines a $\Delta V_{SENSE}$ signal. A second difference element 434 is coupled to the third 428 and fourth 430 sample-and-holds and determines a $\Delta V_{RAMP}$ signal.

In some implementations, the ramp compensation adjustment circuit 406 can further comprise a digital output stage 436 including a comparator 438 coupled to the first 432 and second 434 difference elements that determines a comparison between $\Delta V_{SENSE}$ and $\Delta V_{RAMP}$. The digital output stage 436 can further include an increment/decrement logic 440 that increments or decrements the ramp voltage $V_{RAMP}$ based on the comparison.

During operation, during switch on-time when the ramps are increasing, sampling can begin at the beginning of the on-time, when the sense current ramp begins to rise. $S_1$ is the sampling signal applied to sample-and-hold 424 which samples the sense voltage at the beginning of the on-time. $S_2$ is the sampling signal applied to sample-and-hold 426 which samples the sense voltage at the end of the on-time. The sample-and-hold circuits 424 and 426 adjust and the sampled signals are applied to difference element 432. In a manner similar to sampling of the sense voltage $V_{SENSE}$, the ramp signal $V_{RAMP}$ is also sampled using the $S_3$ sampling signal at the beginning of the off-time ramp, and sampled using the $S_4$ sampling signal at the end of the off-time ramp. Difference element 434 detects the difference between the $V_{RAMP}$ off-time signals. In the illustrative implementation, difference signals from the difference elements 432 and 434 are applied to the comparator 438 that determines which delta of $\Delta V_{SENSE}$ and $\Delta V_{RAMP}$ is larger, so that a ramp select signal is either incremented or decrement using INC/DEC logic 440. The ramp select signal can be an n-bit word in a digital implementation.

In an example digital implementation, a four-bit ramp generator can take sixteen potential slope values to enable determination of whether a slope is too small or too big, and either increment or decrement by one. Continuous iterations can be made to attain convergence on a value. Some of various implementations can continuously oscillate bounce back and forth between two ramps, or can the back and forth oscillation can be detected and one of the values can be selected and held constant.

Referring to FIG. 5, a schematic block diagram shows another embodiment of a ramp compensation adjustment circuit 506 that can be used in a current-mode controller. The ramp compensation adjustment circuit 506 further comprises an analog output stage 536, for example an amplifier, which generates an analog output voltage $V_{CON}$ based on the voltage difference values $\Delta V_{SENSE}$ and $\Delta V_{RAMP}$. The analog output stage 536 can include an amplifier that linearly sets or adjusts in a continuous fashion.

In another example implementation of an analog output stage, a charge pump can be used to operate on the absolute difference of a sample rather than to simply monitor a sign that determines whether the comparison results in a larger or smaller value.

The illustrative adaptive ramp compensation technique, circuits, and systems enables simple implementations in which readily-available signals are sampled to determine $m_1$ and although the $m_2$ value cannot be measured, $m_2$ can be inferred from other values, specifically the on-ramp.

Figure 6C:
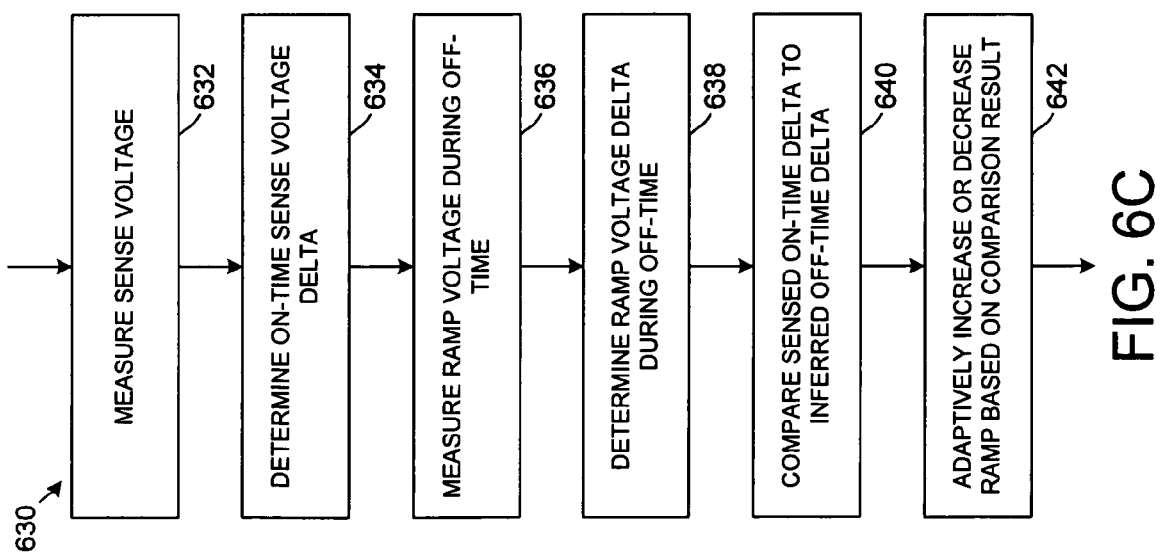

FIGS. 6A through 6C are flow charts showing one or more embodiments or aspects of a current-mode control method. Referring to FIG. 6A, a flow chart illustrates an embodiment of a current-mode control method 600 that comprises generating 602 a slope compensation signal. The slope compensation signal is generated 602 by sensing 604 an indication of current through an inductance element as the current is periodically conducted under control of a switch and monitoring 606 a ramp slope of the sensed current indication during current conduction. When current is not conducted, a ramp slope is inferred 608. The slope compensation signal is determined 610 based on the monitored and inferred ramp slopes.

As shown in FIG. 6B, one or more of various actions can be selected to adjust 620 compensation signal slope. The slope compensation signal slope can be adaptively adjusted 622 to track changes in the ramp slope when current is not conducted. The slope compensation signal slope can be adaptively set 624 to a fractional multiple of the ramp slope when current is not conducted. The method 620 can further comprise adapting 626 to variability in selection of inductor size, operating frequency, and/or output voltage.

Referring to FIG. 6C, an example embodiment of a current-mode control method 630 can comprise measuring 632 the indication of current as a sense voltage $V_{SENSE}$ and determining 634 an on-time sense voltage $V_{SENSE}$ delta $\Delta V_1$ when current is conducted through the inductance element. Ramp voltage $V_{RAMP}$ is measured 636 and off-time ramp voltage $V_{RAMP}$ delta $\Delta V_X$ is determined 638 when current through the inductance element is disabled. The method 630 further comprises comparing 640 delta $\Delta V_X$ to the delta $\Delta V_1$ and adaptively increasing or decreasing 642 the ramp voltage $V_{RAMP}$ delta $\Delta V_X$ based on the comparison.

Figure 7:
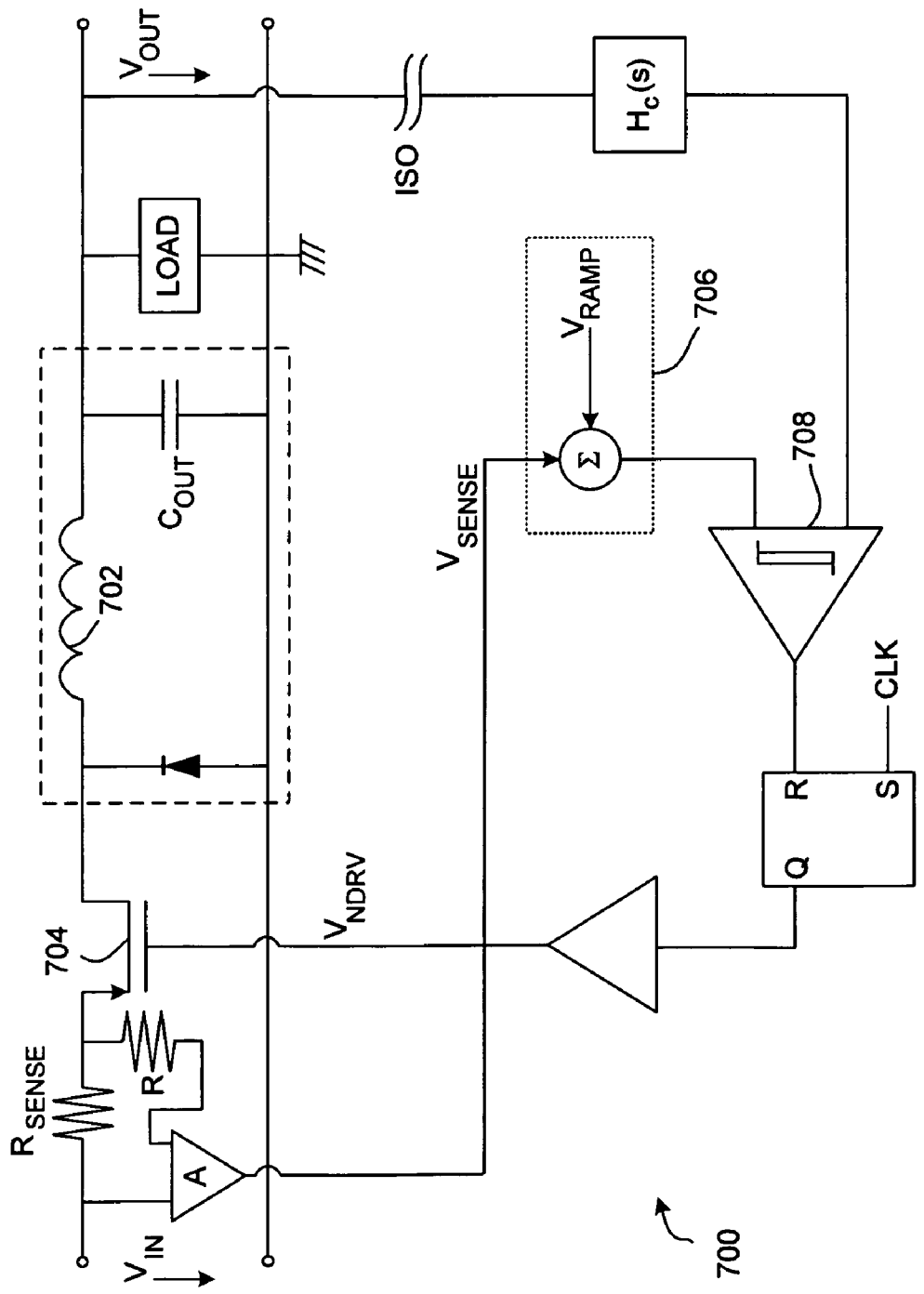
FIG. 7 is a schematic block and circuit diagram illustrating an embodiment of a Buck Direct Current (DC) to DC converter with adaptive ramp compensation.

Referring to FIG. 7, a schematic block and circuit diagram illustrates an embodiment of a Buck Direct Current (DC) to DC converter 700 with adaptive ramp compensation. The DC-DC converter 700 comprises an input voltage terminal 710 and an output voltage terminal 712. An inductance element 702 is coupled to either the input voltage terminal 710, the output voltage terminal 712 or both terminals. One or more semiconductor switches 704 are coupled to the inductance element 702. A feedback loop 714 is coupled between the input voltage terminal 710 and the output voltage terminal 712. A ramp compensation controller 706 is coupled to the DC-DC converter 700 to sense an indication of current through the inductance element 702 and the semiconductor switch or switches 704 and coupled in a configuration that enables control of the semiconductor switch or switches 704. The ramp compensation controller 706 is configured to generate a slope compensation signal based on a measurement of a ramp slope of the sensed current indication when the semiconductor switch or switches 704 conducts current through the inductance element 702 and an inference of a ramp slope when the semiconductor switch or switches 704 stop current through the inductance element 702.

The ramp compensation controller 706 can be configured to measure an on-ramp slope of the sensed current indication, infer an off-ramp slope, and adaptively adjust a slope compensation signal slope to a fractional multiple of the off-ramp slope to track changes in the off-ramp slope.

In some implementations or in some conditions the ramp compensation controller 706 can be configured to adaptively set a slope compensation signal slope to a fractional multiple of the off-ramp slope that adapts to variability in selection of inductor size, operating frequency, and/or output voltage.

In a specific implementation, the ramp compensation controller 706 can be configured to measure the indication of current as a sense voltage $V_{SENSE}$ and determine a switch on-time sense voltage $V_{SENSE}$ delta $\Delta V_1$ when the semiconductor switch or switches 704 enable current through the inductance element 702. The ramp compensation controller 706 also measures a ramp voltage $V_{RAMP}$ and determines a switch off-time ramp voltage $V_{RAMP}$ delta $\Delta V_X$ when the semiconductor switch or switches 704 disable current through the inductance element 702. The ramp compensation controller 706 compares the delta $\Delta V_X$ to the delta $\Delta V_1$, and adaptively increases or decreases the ramp voltage $V_{RAMP}$ delta $\Delta V_X$ based on the comparison.

Figure 8:
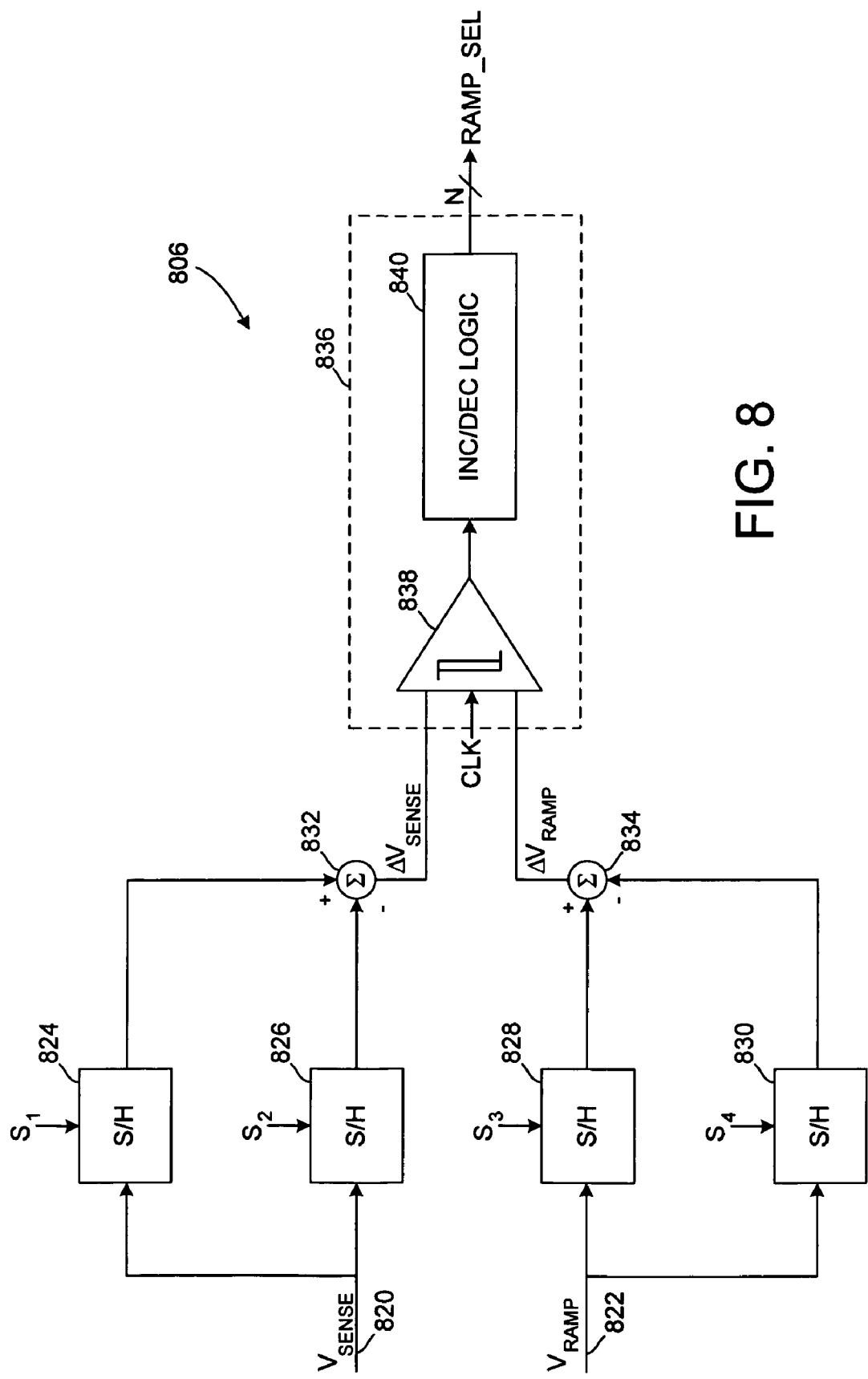
FIG. 8 is a schematic block diagram showing an embodiment of a ramp compensation controller that can be used in the DC-DC converter.

Referring to FIG. 8, a schematic block diagram shows an embodiment of a ramp compensation controller 806 that can be used in the DC-DC converter 700 shown in FIG. 7. The ramp compensation controller comprises a sense voltage $V_{SENSE}$ input line 820, a ramp voltage $V_{RAMP}$ input line 820, and multiple sample-and-hold elements. A first sample-and-hold 824 id coupled to the sense voltage $V_{SENSE}$ input line 820 and actuated by a sampling signal $S_1$ at on-time beginning of the semiconductor switch 804. A second sample-and-hold 826 is coupled to the sense voltage $V_{SENSE}$ input line 820 and actuated by a sampling signal $S_2$ at on-time termination of the semiconductor switch 804. A third sample-and-hold 828 is coupled to the ramp voltage $V_{RAMP}$ input line 822 and actuated by a sampling signal $S_3$ at off-time beginning of the semiconductor switch 804. A fourth sample-and-hold 830 is coupled to the ramp voltage $V_{RAMP}$ input line 822 and actuated by a sampling signal $S_4$ at off-time termination of the semiconductor switch 804. A first difference element 832 is coupled to the first 824 and second 826 sample-and-holds and determines a $\Delta V_{SENSE}$ signal. A second difference element 834 is coupled to the third 828 and fourth 830 sample-and-holds and determines a $\Delta V_{RAMP}$ signal. A comparator 838 coupled to the first 832 and second 834 difference elements determines a comparison between $\Delta V_{SENSE}$ and $\Delta V_{RAMP}$. Logic 840 increases or decreases the ramp voltage $V_{RAMP}$ based on the comparison.

In the illustrative embodiment, the inductance element 802 is coupled to the output voltage terminal in a Buck converter configuration. Other configurations can be implemented.

Figure 9:
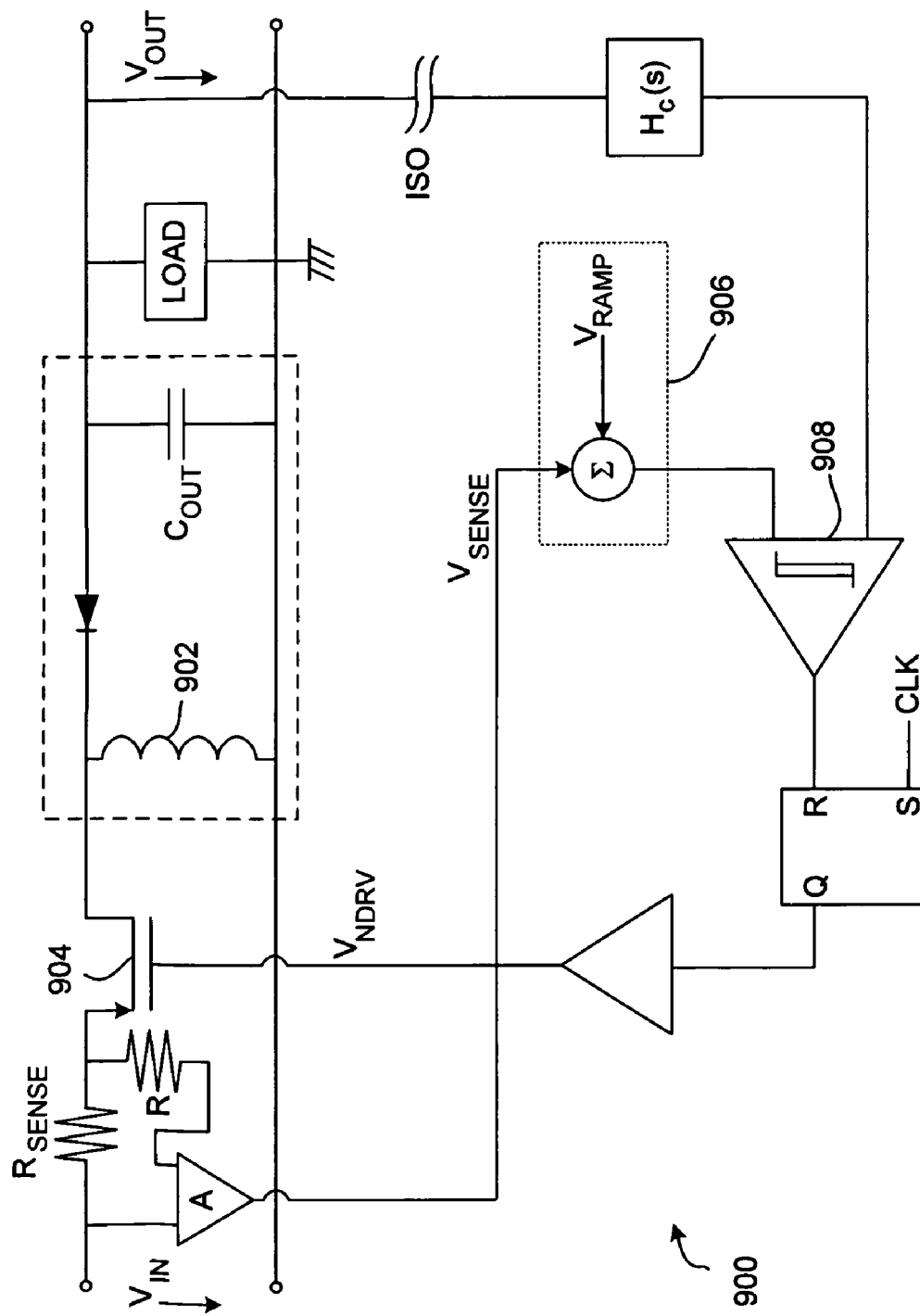
FIG. 9 is a schematic circuit and block diagram illustrating an embodiment of a current-mode controller that operates using adaptive ramp compensation for current-mode DC-DC converters.

Referring again to FIG. 9, a schematic circuit and block diagram illustrates an embodiment of a current-mode controller 900 that operates using adaptive ramp compensation for current-mode DC-DC converters. The illustrative current-mode controller 900 is in a Buck-Boost configuration and comprises an inductance element 902, a semiconductor switch 904 coupled to the inductance element 902, and a ramp compensator 906. The ramp compensator 906 is coupled to sense an indication of current through the inductance element 902 and coupled to control the semiconductor switch 904 and senses current during on-time of the switch 904, infers current during off-time of the switch 904, and determines a slope compensation signal based on the sensed and inferred currents.

The ramp compensator 906 can be configured to adaptively set slope compensation signal slope as a function of a fractional multiple of the off-time current that adapts to variability in selection of inductor size, operating frequency, and/or output voltage.

An article of manufacture can be formed that comprises the inductance element 902, the semiconductor switch 904, and the ramp compensator 906.

Figure 10:
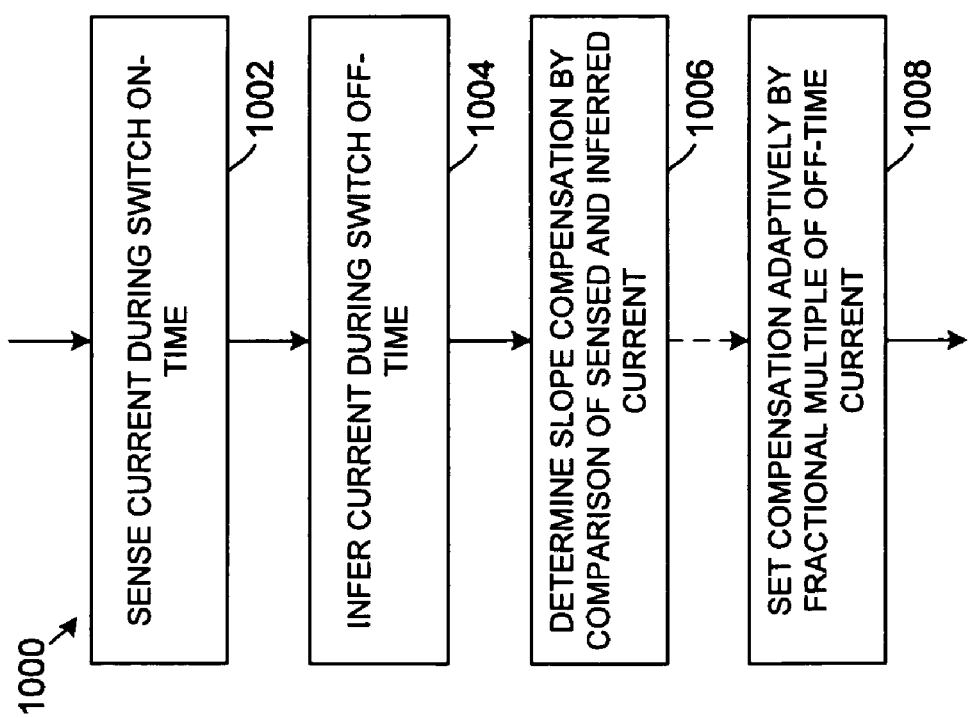
FIG. 10 is a flow chart showing an embodiment or aspect of a method for controlling a DC-DC converter.

FIG. 10 is a flow chart showing an embodiment or aspect of a method for controlling a DC-DC converter. A method 1000 for controlling a DC-DC converter comprises controlling current-mode operation of the DC-DC converter by sensing 1002 current during on-time of the DC-DC converter, inferring 1004 current during off-time of the DC-DC converter, and determining 1006 a slope compensation signal based on the sensed and inferred currents.

In some embodiments, slope compensation signal slope can be set 1008 adaptively as a function of a fractional multiple of the off-time current. For example, the slope compensation signal slope can be set adaptively as a function of a fractional multiple of the off-time current that adapts to variability in selection of inductor size, operating frequency, output voltage, and other parameters and conditions.

The illustrative adaptive ramp compensation technique can be used in any current-mode DC-DC converter topology for setting the ramp to a target value in a manner that is adaptive to components of a system.

Figure 11:
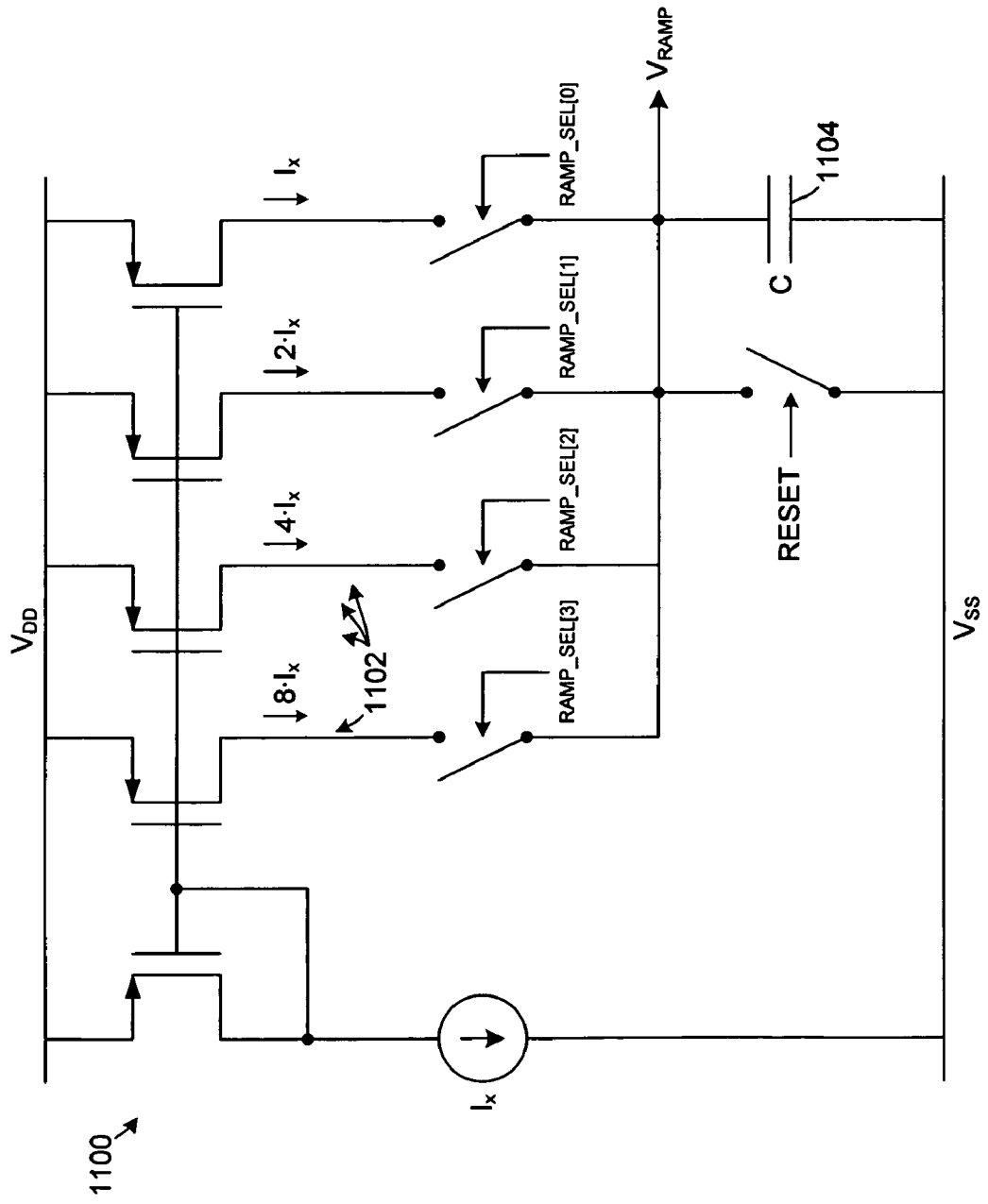
FIG. 11 is a schematic circuit diagram illustrating an embodiment of a digitally-adjusted ramp generator circuit.

For example, as shown in FIG. 11, a schematic circuit diagram illustrates an embodiment of a digitally-adjusted ramp generator circuit 1100 which can be used in the various current-mode controllers depicted herein. The digitally-adjusted ramp generator circuit 1100 receives a control value RAMP_SEL and uses a set of binary-weighted current mirrors 1102 to set a total charging current value, a DC current that flows into a capacitor 1104 thereby generating a linear rise in voltage. The capacitor 1104 is periodically discharged by a RESET signal, generating a sawtooth wave $V_{RAMP}$.

Figure 12:
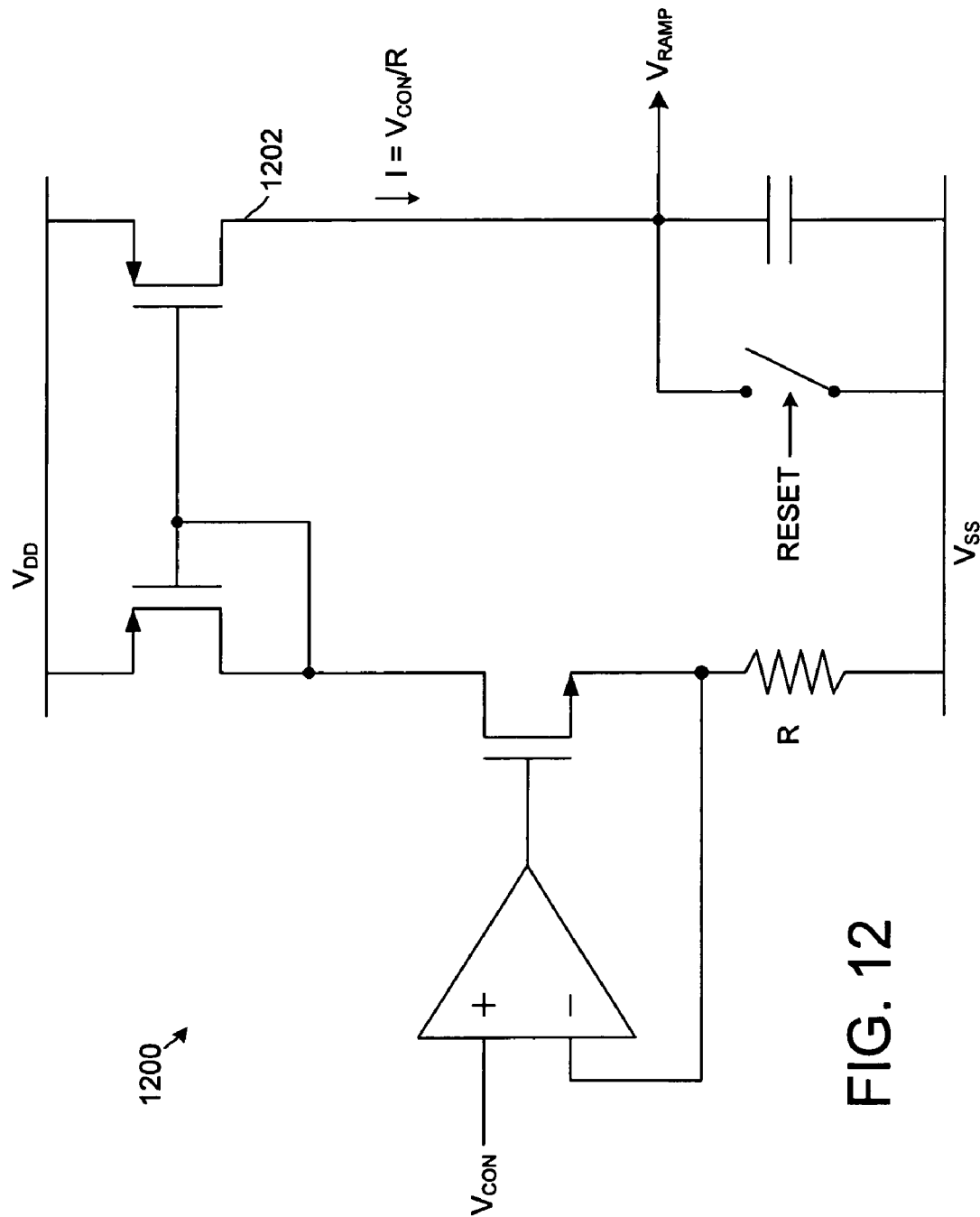
FIG. 12 is a schematic circuit diagram showing an embodiment of a voltage-controller ramp generator circuit.

FIG. 12 is a schematic circuit diagram showing an embodiment of a voltage-controller ramp generator circuit 1200 which can be used in various current-mode controllers. The voltage-controller ramp generator circuit 1200 is similar to the digitally-adjusted ramp generator circuit 1100 except that the charging current is set by an analog voltage-to-current (V-to-I) conversion stage 1202. An input control signal to the circuit 1200 is an analog voltage $V_{CON}$.

The adaptive ramp compensation technique can further be used generally for current-mode loops in power converters, in various types of power converter topologies, and in suitable implementations of audio amplifiers or power amplifiers.

In various applications, sense voltage is essentially determined by the current passing through an inductor which may be termed a sense current. Some circuits can regulate a peak current so that the current ramps upward, and trips a comparator to generate an output current. The illustrative adaptive ramp compensator and associated technique can be used in a peak mode detection current-mode controller type circuit. Similarly, the adaptive ramp compensator and technique can be used in a system that does not use peak mode detection but senses in the opposite manner so that signal polarity is reversed, and operation of the ramp compensator is inverted so that the sensed voltage slope is decreasing. Accordingly, the adaptive ramp compensator operates generically to adapt one ramp to another, regardless of signal polarity.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A current-mode controller comprising:
an inductance element;
at least one semiconductor switch coupled to the inductance element; and
a ramp compensator coupled to sense an indication of current through the inductance element and coupled to control the at least one semiconductor switch that measures an on-ramp slope of a sensed current indication, infers an off-ramp slope, and adaptively adjusts a slope compensation signal slope to track changes in the off-ramp slope, wherein:
the ramp compensator is configured to measure the indication of current as a sense voltage $V_{SENSE}$ and determine a switch on-time sense voltage $V_{SENSE}$ delta $\Delta V_1$ when the at least one semiconductor switch enables current through the inductance element, measure a ramp voltage $V_{RAMP}$ and determine a switch off-time ramp voltage $V_{RAMP}$ delta $\Delta V_X$ when the at least one semiconductor switch disables current through the inductance element, compare $\Delta V_X$ to $\Delta V_1$, and adaptively increase or decrease the ramp voltage $V_{RAMP}$ delta $\Delta V_X$ based on the comparison.

2. A current-mode controller comprising:
an inductance element;
at least one semiconductor switch coupled to the inductance element; and
a ramp compensator coupled to sense an indication of current through the inductance element and coupled to control the at least one semiconductor switch that measures an on-ramp slope of a sensed current indication, infers an off-ramp slope, and adaptively adjusts a slope compensation signal slope to track changes in the off-ramp slope, wherein the ramp compensator comprises:
a sense voltage $V_{SENSE}$ input line;
a ramp voltage $V_{RAMP}$ input line;
a first sample-and-hold coupled to the sense voltage $V_{SENSE}$ input line and actuated by a sampling signal $S_1$ at on-time beginning of the at least one semiconductor switch;
a second sample-and-hold coupled to the sense voltage $V_{SENSE}$ input line and actuated by a sampling signal $S_2$ at on-time termination of the at least one semiconductor switch;
a third sample-and-hold coupled to the ramp voltage $V_{RAMP}$ input line and actuated by a sampling signal $S_3$ at off-time beginning of the at least one semiconductor switch;
a fourth sample-and-hold coupled to the ramp voltage $V_{RAMP}$ input line and actuated by a sampling signal $S_4$ at off-time termination of the at least one semiconductor switch;
a first difference element coupled to the first and second sample-and-holds that determines a $\Delta V_{SENSE}$ signal; and
a second difference element coupled to the third and fourth sample-and-holds that determines a $\Delta V_{RAMP}$ signal.

3. The controller according to claim 2 further comprising:
the ramp compensator further comprising a digital output stage comprising:
a comparator coupled to the first and second difference elements that determines a comparison between $\Delta V_{SENSE}$ and $\Delta V_{RAMP}$; and
an increment/decrement logic that increments or decrements the ramp voltage $V_{RAMP}$ based on the comparison.

4. The controller according to claim 2 further comprising:
the ramp compensator further comprising an analog output stage that compares $\Delta V_{SENSE}$ to $\Delta V_{RAMP}$ and increases or decreases ramp voltage $V_{RAMP}$ based on the comparison.

5. A current-mode control method comprising:
generating a slope compensation signal comprising:
sensing an indication of current through an inductance element as the current is periodically conducted under control of a switch;
monitoring a ramp slope of the sensed current indication during current conduction;
inferring a ramp slope when current is not conducted;
determining the slope compensation signal based on the monitored and inferred ramp slopes;
measuring the indication of current as a sense voltage $V_{SENSE}$;
determining an on-time sense voltage $V_{SENSE}$ delta $\Delta V_1$ when current is conducted through the inductance element;
measuring a ramp voltage $V_{RAMP}$;
determining an off-time ramp voltage $V_{RAMP}$ delta $\Delta V_X$ when current through the inductance element is disabled;
comparing the delta $\Delta V_X$ to the delta $\Delta V_1$; and
adaptively increasing or decreasing the ramp voltage $V_{RAMP}$ delta $\Delta V_X$ based on the comparison.

6. A Direct Current (DC) to DC converter comprising:
an input voltage terminal;
an output voltage terminal;
an inductance element coupled to at least one of the input voltage terminal and the output voltage terminal;
at least one semiconductor switch coupled to the inductance element;
a feedback loop coupled between the input voltage terminal and the output voltage terminal; and
a ramp compensation controller coupled to sense an indication of current through the inductance element and the at least one semiconductor switch and coupled to control the at least one semiconductor switch, the ramp compensation controller configured to generate a slope compensation signal based on a measurement of a ramp slope of the sensed current indication when the at least one semiconductor switch conducts current through the inductance element and an inference of a ramp slope when the at least one semiconductor switch stops current through the inductance element, wherein the ramp compensation controller is configured to measure the indication of current as a sense voltage $V_{SENSE}$ and determine a switch on-time sense voltage $V_{SENSE}$ delta $\Delta V_1$ when the at least one semiconductor switch enables current through the inductance element, measure a ramp voltage $V_{RAMP}$ and determine a switch off-time ramp voltage $V_{RAMP}$ delta $\Delta V_X$ when the at least one semiconductor switch disables current through the inductance element, compare the delta $\Delta V_X$ to the delta $\Delta V_1$, and adaptively increase or decrease the ramp voltage $V_{RAMP}$ delta $\Delta V_X$ based on the comparison.

7. A Direct Current (DC) to DC converter comprising:
an input voltage terminal;
an output voltage terminal;
an inductance element coupled to at least one of the input voltage terminal and the output voltage terminal;
at least one semiconductor switch coupled to the inductance element;
a feedback loop coupled between the input voltage terminal and the output voltage terminal; and
a ramp compensation controller coupled to sense an indication of current through the inductance element and the at least one semiconductor switch and coupled to control the at least one semiconductor switch, the ramp compensation controller configured to generate a slope compensation signal based on a measurement of a ramp slope of the sensed current indication when the at least one semiconductor switch conducts current through the inductance element and an inference of a ramp slope when the at least one semiconductor switch stops current through the inductance element, wherein the ramp compensation controller comprises:
a sense voltage $V_{SENSE}$ input line;
a ramp voltage $V_{RAMP}$ input line;
a first sample-and-hold coupled to the sense voltage $V_{SENSE}$ input line and actuated by a sampling signal $S_1$ at on-time beginning of the at least one semiconductor switch;
a second sample-and-hold coupled to the sense voltage $V_{SENSE}$ input line and actuated by a sampling signal $S_2$ at on-time termination of the at least one semiconductor switch;
a third sample-and-hold coupled to the ramp voltage $V_{RAMP}$ input line and actuated by a sampling signal $S_3$ at off-time beginning of the at least one semiconductor switch;
a fourth sample-and-hold coupled to the ramp voltage $V_{RAMP}$ input line and actuated by a sampling signal $S_4$ at off-time termination of the at least one semiconductor switch;
a first difference element coupled to the first and second sample-and-holds that determines a $\Delta V_{SENSE}$ signal;
a second difference element coupled to the third and fourth sample-and-holds that determines a $\Delta V_{RAMP}$ signal;
a comparator coupled to the first and second difference elements that determines a comparison between $\Delta V_{SENSE}$ and $\Delta V_{RAMP}$; and
a logic that increases or decreases the ramp voltage $V_{RAMP}$ based on the comparison.

* * * * *